US012723808B2

(12) United States Patent
Kojima

(10) Patent No.: US 12,723,808 B2
(45) Date of Patent: Sep. 1, 2026

(54) GOLF CLUB HANDLE DRYING DEVICE

(71) Applicant: Craig Kojima, Kapolei, HI (US)

(72) Inventor: Craig Kojima, Kapolei, HI (US)

( * ) Notice: Subject to any disclaimer, the term of this patent is extended or adjusted under 35 U.S.C. 154(b) by 427 days.

(21) Appl. No.: 18/429,956

(22) Filed: Feb. 1, 2024

(65) Prior Publication Data

US 2025/0251192 A1 Aug. 7, 2025

(51) Int. Cl.
*F26B 9/00* (2006.01)
*A63B 57/60* (2015.01)
*A63B 60/36* (2015.01)
*F26B 21/50* (2026.01)

(52) U.S. Cl.
CPC .............. *F26B 9/003* (2013.01); *A63B 57/60* (2015.10); *A63B 60/36* (2015.10); *F26B 21/50* (2026.01); *A63B 2057/605* (2015.10)

(58) Field of Classification Search
CPC .. F26B 9/003; F26B 21/50; F26B 3/04; F26B 21/001; F26B 23/06; F26B 25/08; A63B 57/60; A63B 60/36; A63B 2057/605; A63B 2225/64
See application file for complete search history.

(56) References Cited

U.S. PATENT DOCUMENTS 4,570,358 A 2/1986 Sacerdote
4,934,066 A 6/1990 Rose
D370,706 S 6/1996 Mulvey
5,834,738 A 11/1998 Wilson
6,499,230 B1 * 12/2002 Fix .......................... A63B 57/60 34/223
7,834,297 B1 * 11/2010 Kendall .................. F26B 9/003 206/315.3
D932,692 S 10/2021 Wang
2003/0170013 A1 * 9/2003 Patshkowski .......... A63B 55/00 392/379
2006/0179679 A1 * 8/2006 Ivey ...................... F26B 21/001 134/21
2007/0094884 A1 * 5/2007 Micheludis ............. F26B 9/003 34/107
2007/0251844 A1 11/2007 Reid
2021/0060395 A1 * 3/2021 Holtz ..................... A63B 60/36
2022/0054910 A1 * 2/2022 Holtz ..................... A63B 60/36

FOREIGN PATENT DOCUMENTS

CA 2571741 10/2007
GB 2130698 A * 6/1984 ............. A63B 61/00
JP 3238409 U * 7/2022

* cited by examiner

*Primary Examiner* — David J Laux

(57) ABSTRACT

A drying device for drying a golf club handle includes a housing which defines an interior space therein and is elongated between a top end and a bottom end. The housing also defines an opening at the top end which extends into the interior space of the housing and is sized and configured to accommodate the golf club handle. A blower wheel is rotatably mounted in the interior space of the housing. The blower wheel is rotatable about a central longitudinal axis of the housing and has blades which are angled such that the blower wheel is configured to urge air inwardly when rotated. A heating element selectively heats air in the interior space of the housing.

14 Claims, 9 Drawing Sheets

GOLF CLUB HANDLE DRYING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to drying devices and more particularly pertains to a new drying device for drying a golf club handle.

(2) Description of Related Art Including Information Disclosed Under 37 CFR 1.97 and 1.98

Various drying devices are disclosed by the prior art which are operable to receive a golf club handle into a chamber and dry the golf club handle via blowing air against the golf club handle. However, the prior art only describes such devices as having axial fans for blowing air against the golf club handle. The prior art fails to disclose a blower wheel which directs air inwardly toward the golf club handle and which has a heating element that surrounds the blower wheel.

BRIEF SUMMARY OF THE INVENTION

An embodiment of the disclosure meets the needs presented above by generally comprising a housing which defines an interior space therein and is elongated between a top end and a bottom end. The housing also defines an opening at the top end which extends into the interior space of the housing and is sized and configured to accommodate the golf club handle. A blower wheel is rotatably mounted in the interior space of the housing. The blower wheel is rotatable about a central longitudinal axis of the housing and has blades which are angled such that the blower wheel is configured to urge air inwardly when rotated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
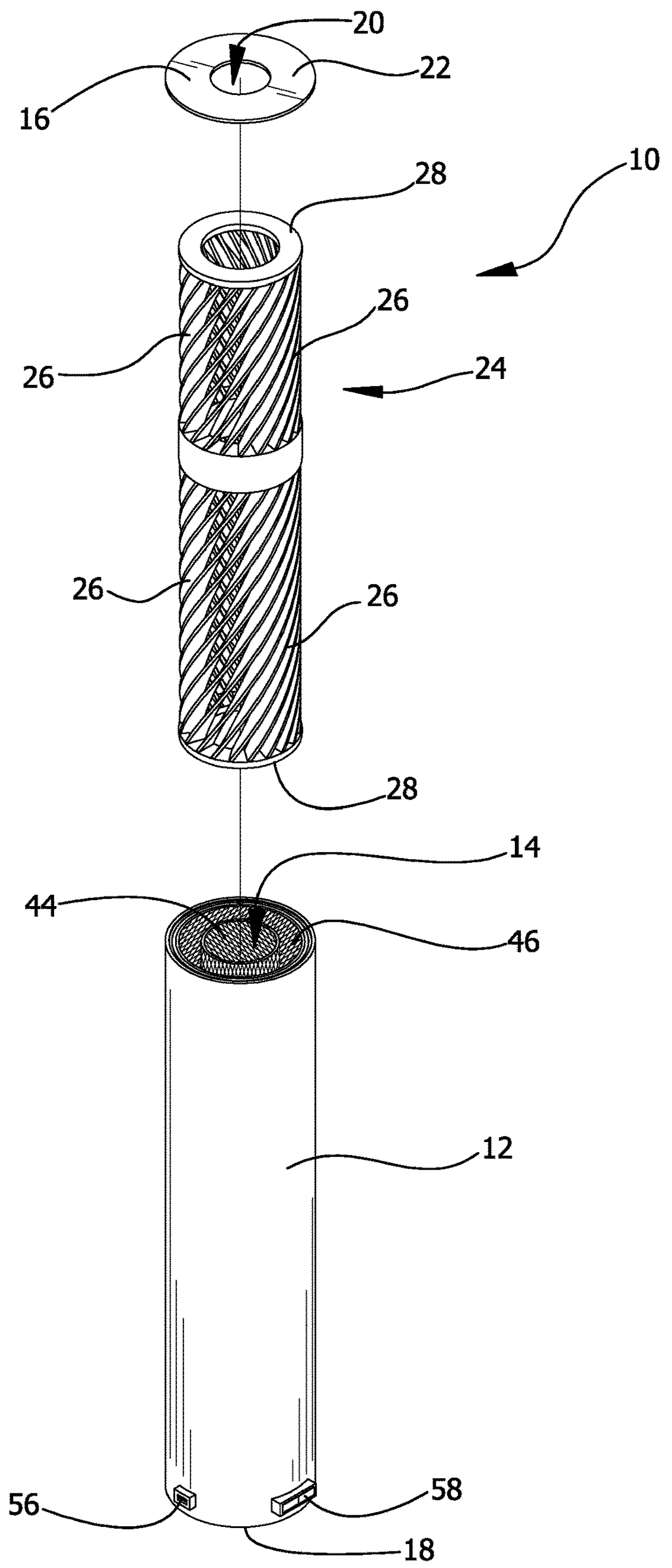
FIG. 1 is an exploded perspective view of a drying device according to an embodiment of the disclosure.
Figure 2:
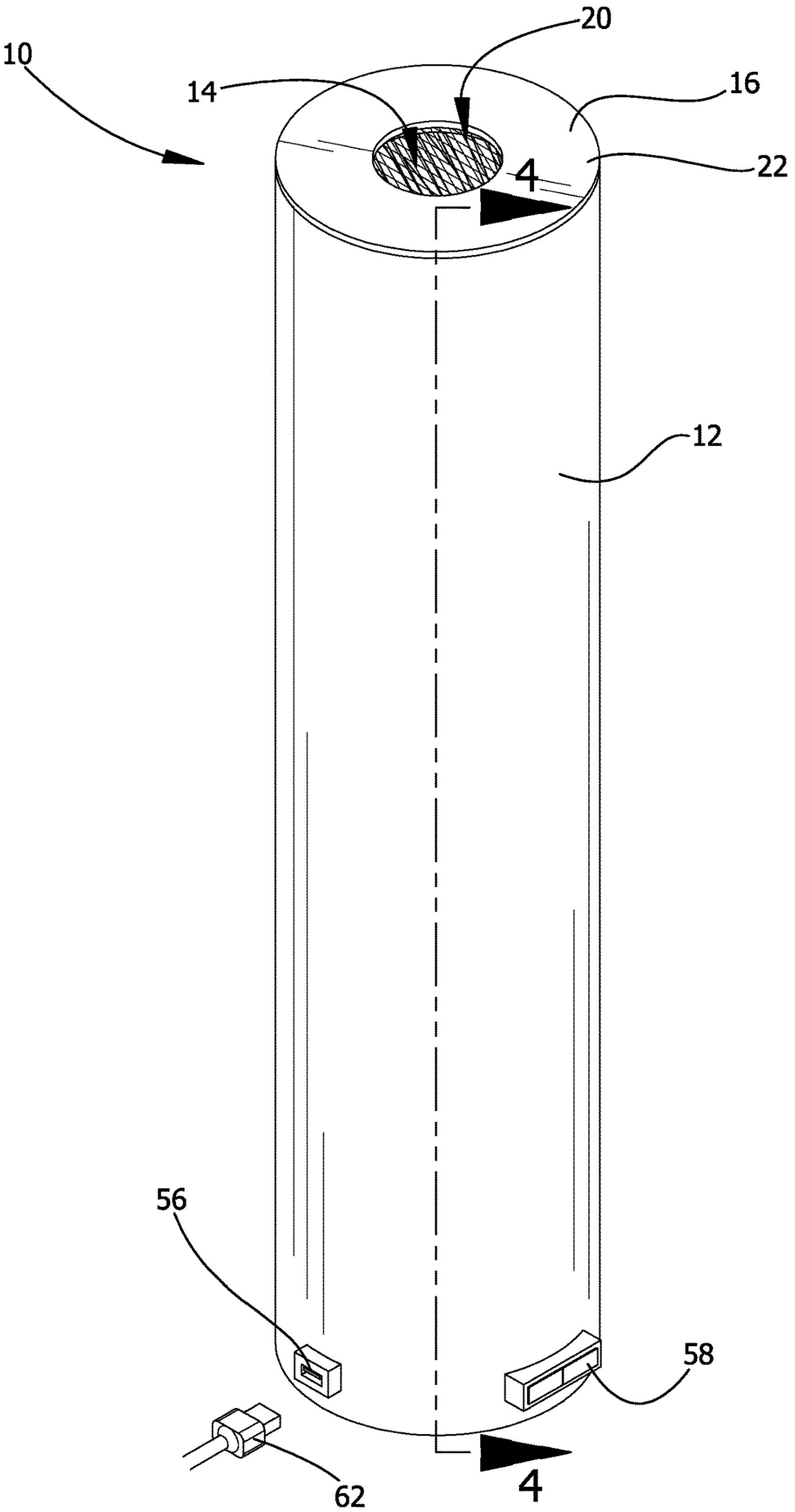
FIG. 2 is a perspective view of an embodiment of the disclosure.
Figure 3:
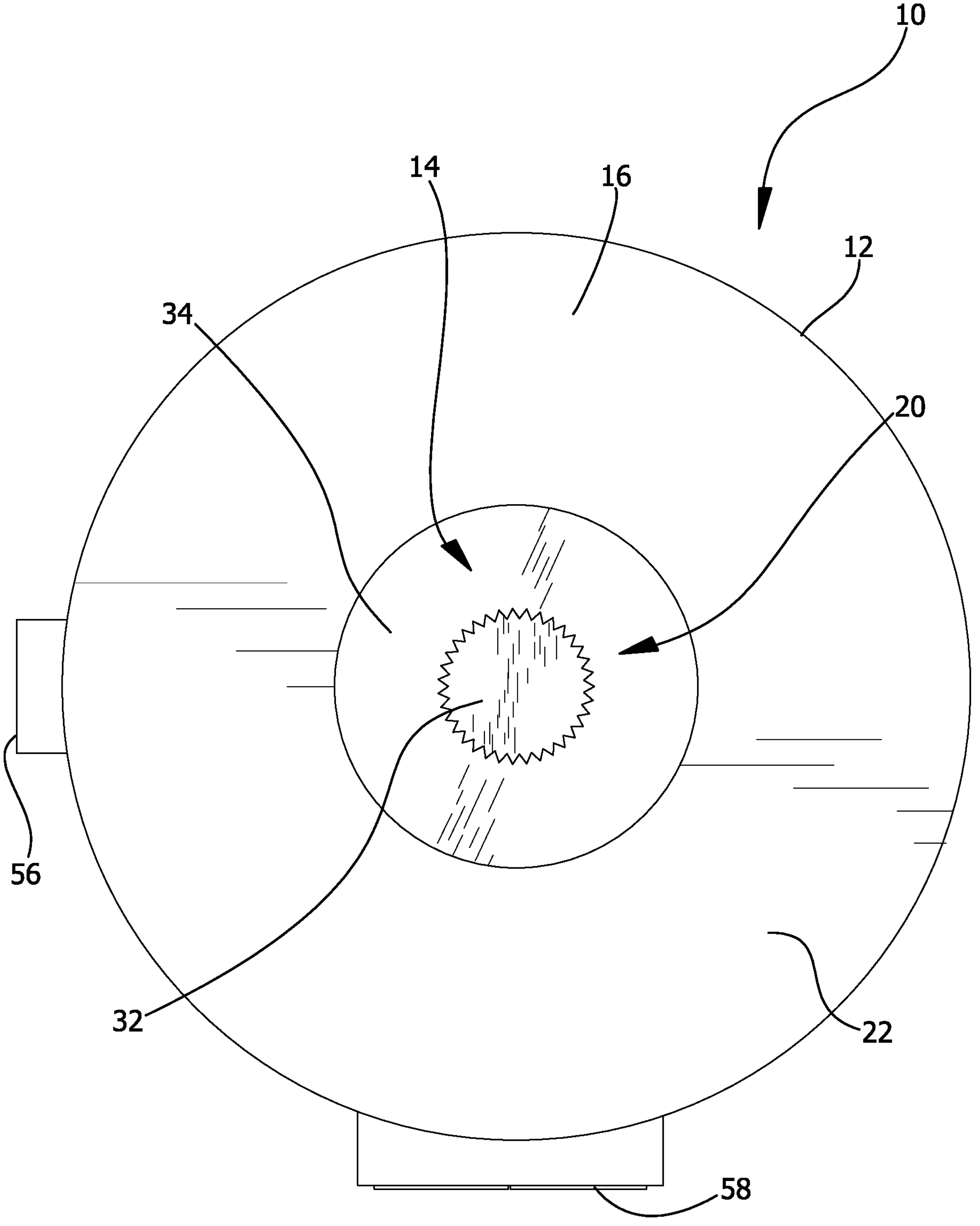
FIG. 3 is a top view of an embodiment of the disclosure.
Figure 4:
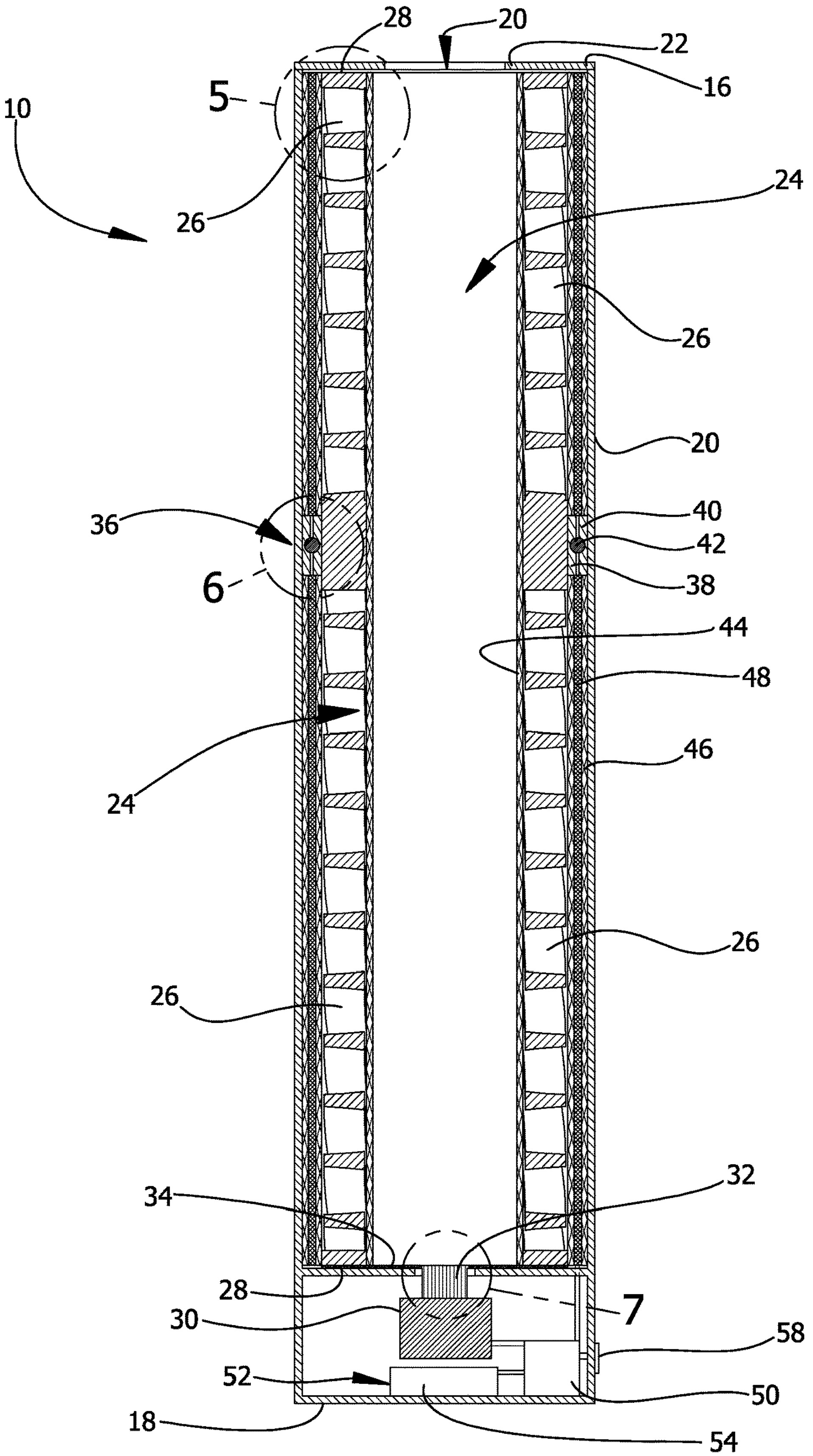
FIG. 4 is a cross-section view of an embodiment of the disclosure taken from Line 4-4 in FIG. 2.
Figure 5:
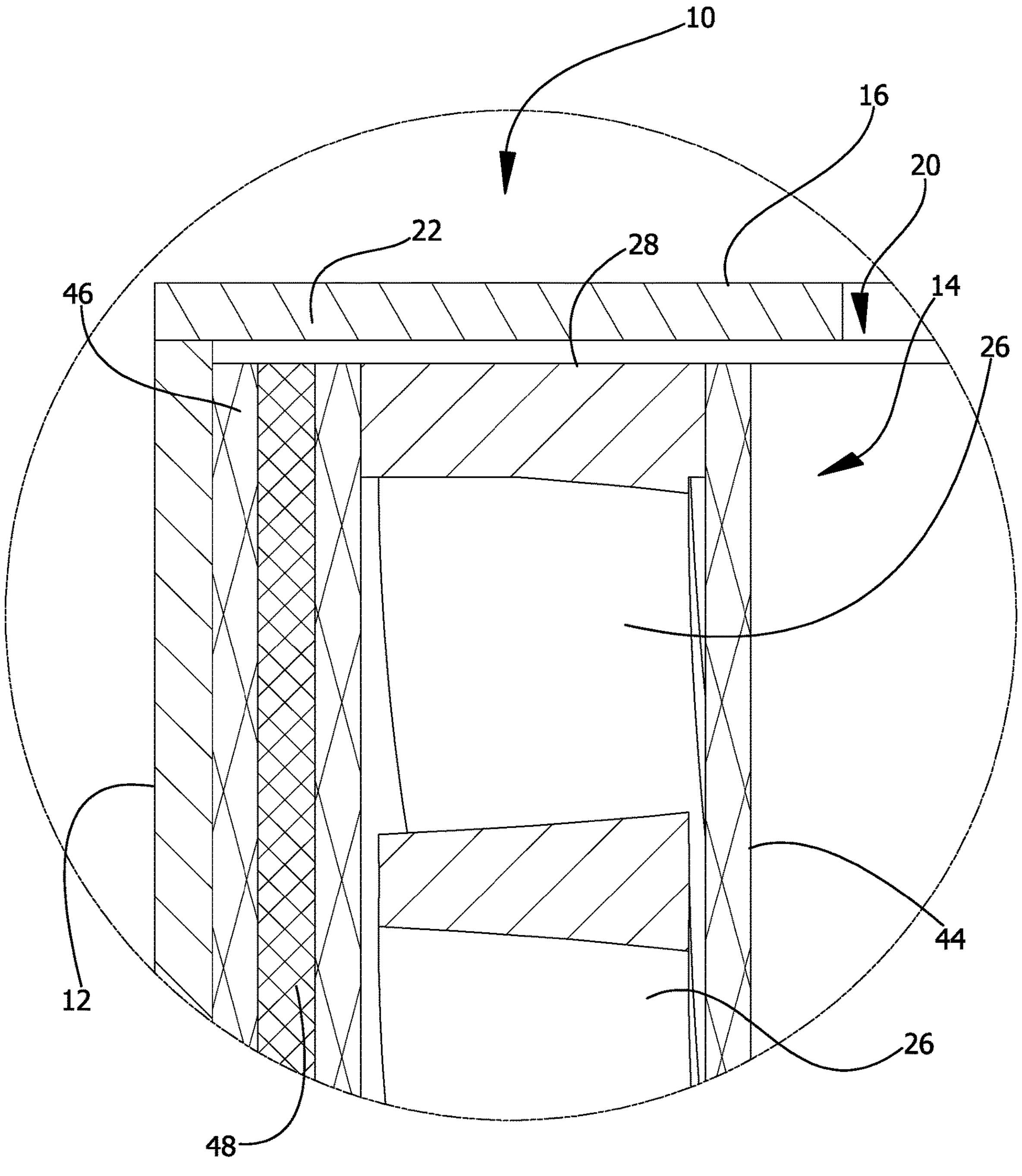
FIG. 5 is a detail view of an embodiment of the disclosure taken from Window 5 in FIG. 4.
Figure 6:
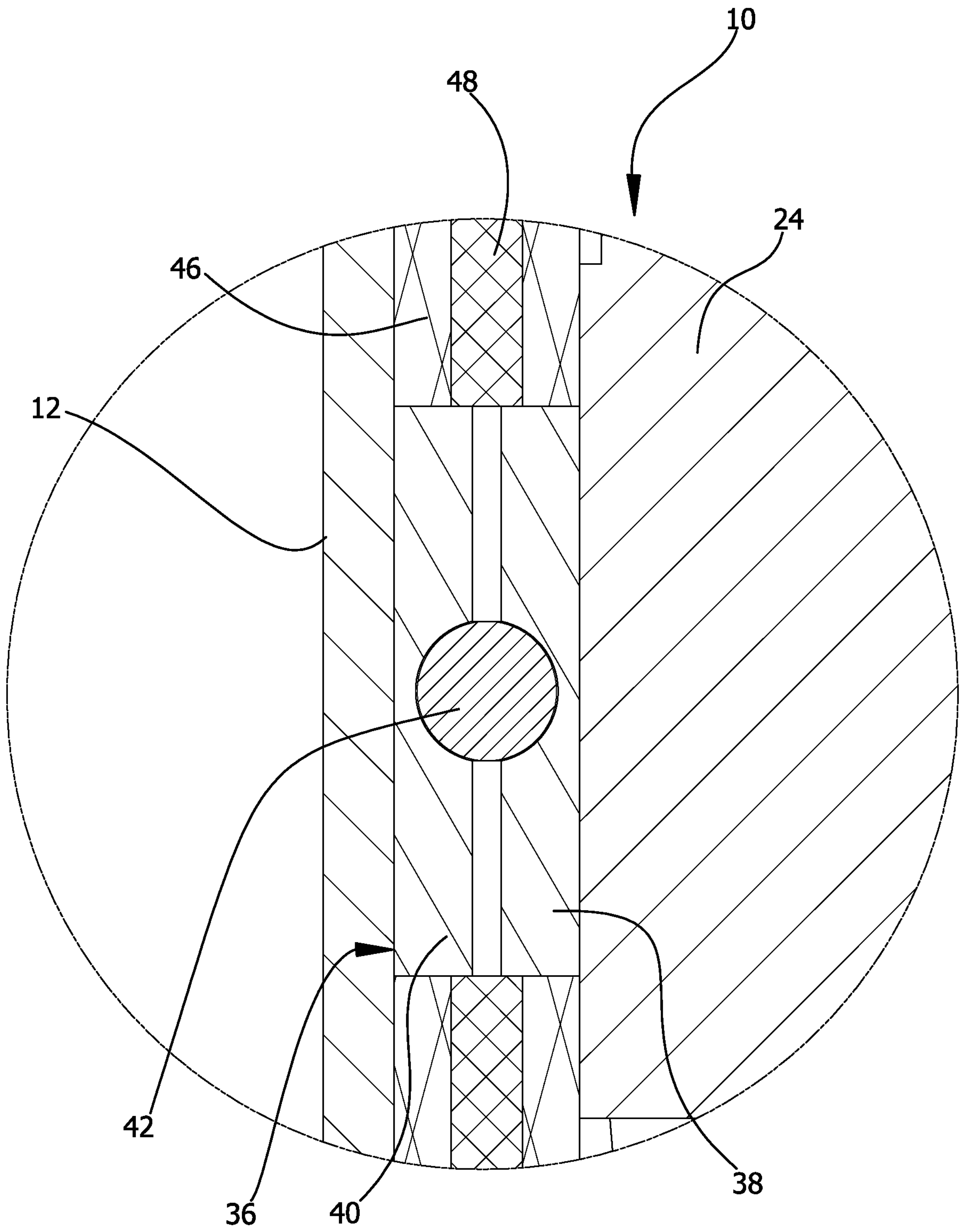
FIG. 6 is a detail view of an embodiment of the disclosure taken from Window 6 in FIG. 4.
Figure 7:
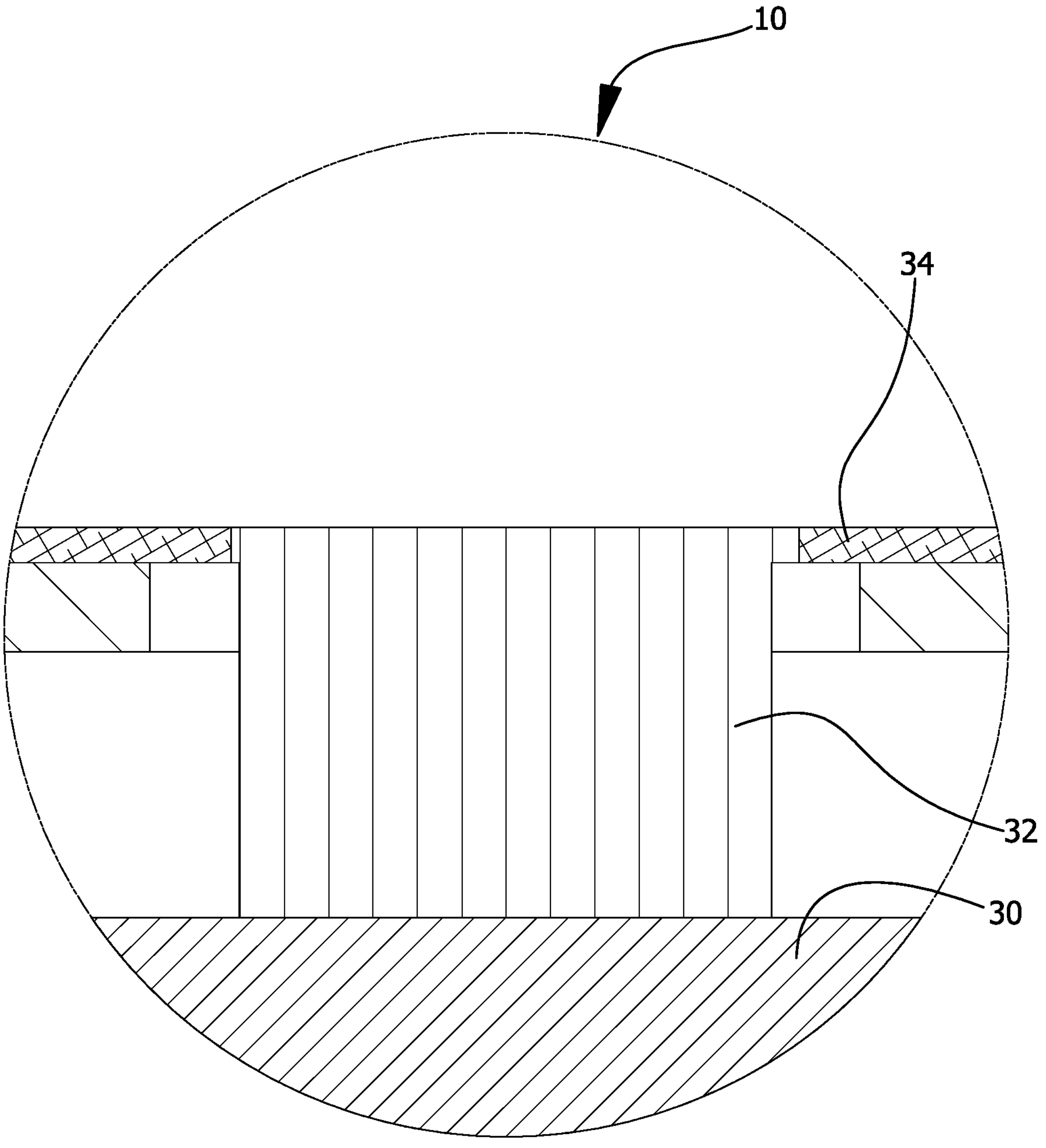
FIG. 7 is a detail view of an embodiment of the disclosure taken from Window 7 in FIG. 4.
Figure 8:
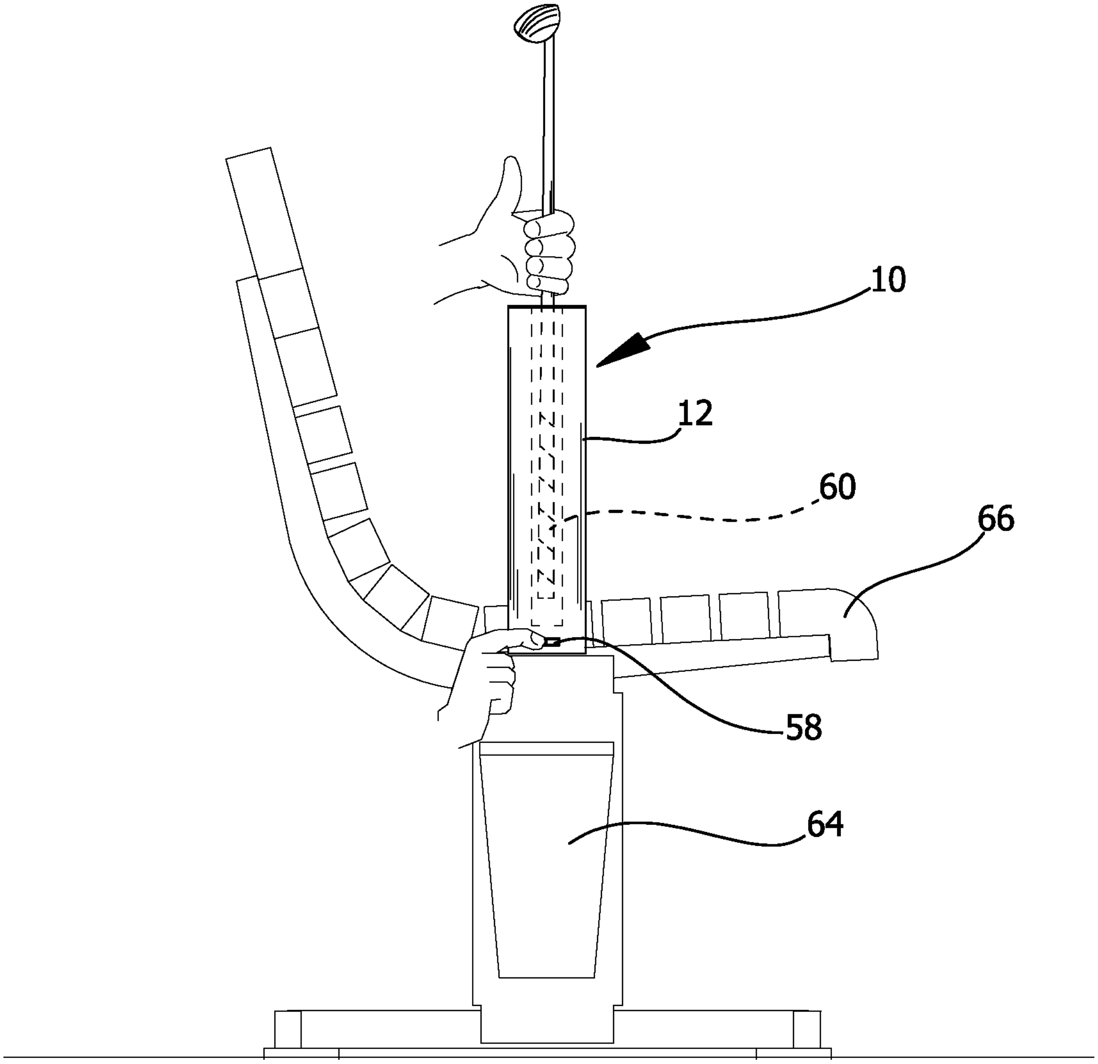
FIG. 8 is an in-use view of an embodiment of the disclosure.
Figure 9:
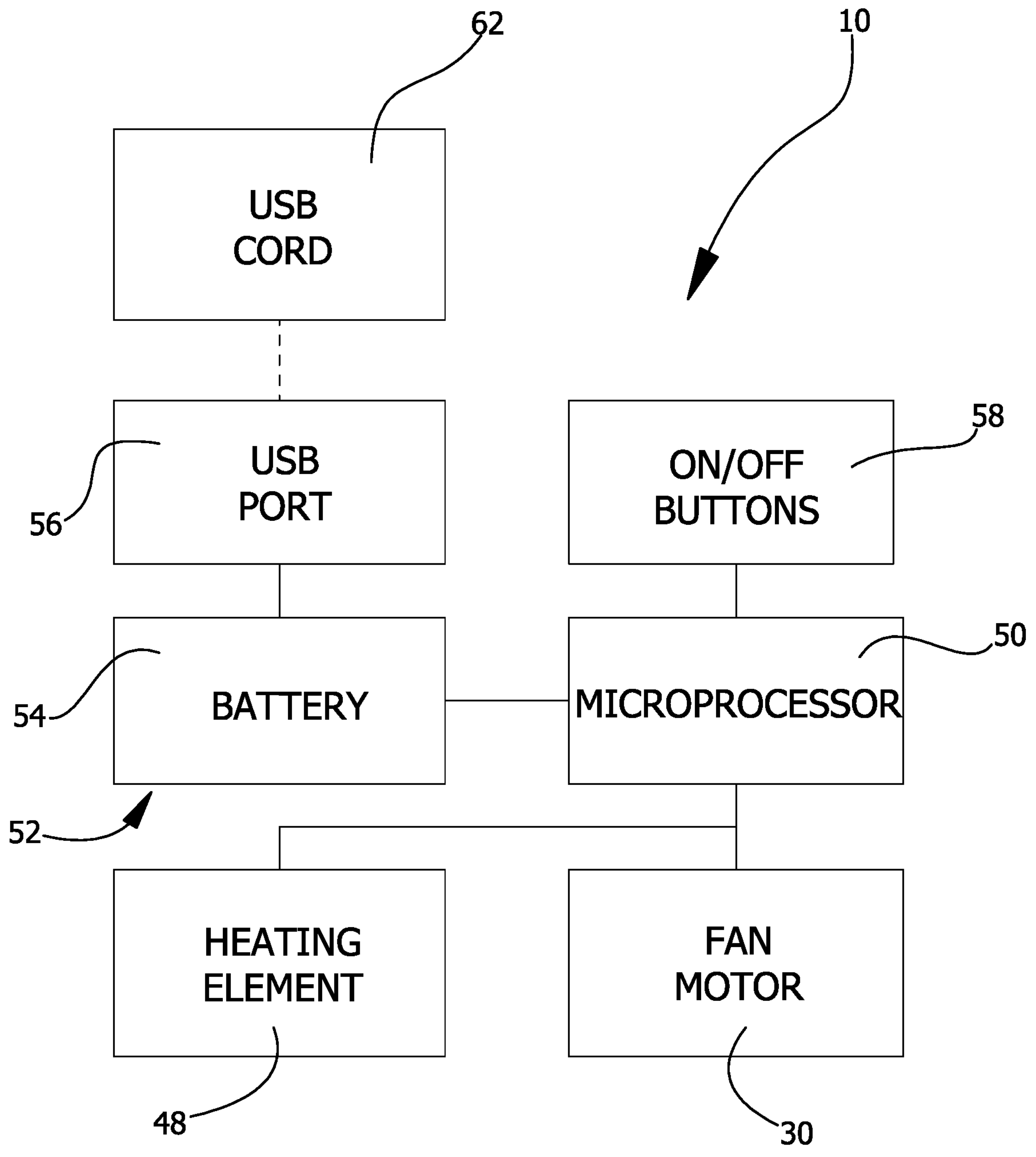
FIG. 9 is a block diagram of an embodiment of the disclosure.

With reference now to the drawings, and in particular to FIGS. 1 through 9 thereof, a new drying device embodying the principles and concepts of an embodiment of the disclosure and generally designated by the reference numeral 10 will be described.

As best illustrated in FIGS. 1 through 9, the drying device 10 generally comprises a housing 12 which defines an interior space 14 therein. The housing 12 is elongated between a top end 16 and a bottom end 18. The housing 12 also defines an opening 20 at the top end 16 which extends into the interior space 14 of the housing 12. The opening 20 is sized and configured to accommodate a golf club handle 60. In some embodiments, an upper portion 22 of the housing 12 may define a cover which is removable to facilitate access to the interior space 14. A blower wheel 24 is rotatably mounted in the interior space 14 of the housing 12. The blower wheel 24 is rotatable about a central longitudinal axis of the housing 12 and has blades 26 angled such that the blower wheel 24 is configured to urge air inwardly when rotated. For example, the blades 26 may extend outwardly and in a first rotational direction such that the blades 26 direct air inwardly when the blower wheel 24 is rotated in the first rotational direction. The blades 26 are also helically shaped between a pair of ends 28 of the blower wheel 24.

A motor 30 is mounted in the interior space 14 of the housing 12 and operatively mounted to the blower wheel 24. The motor 30 is coupled to the blower wheel 24 via a gear 32 and a base plate 34, wherein the base plate 34 has internal teeth which engage external teeth of the gear 32 to facilitate a transmission of torque from the motor 30 to the blower wheel 24. The blower wheel 24 may be fixedly coupled to the base plate 34 or may be removably attached to the base plate 34 via any suitable fastener. A bearing 36 is mounted in the interior space 14 of the housing 12 distally from the bottom end 18 of the housing 12. The blower wheel 24 is rotatably mounted in the bearing 36, which acts to stabilize the blower wheel 24 distally from the motor 30. The bearing 36 includes an outer member 40 fixed to the housing 12 and an inner member 38 fixed via friction or the like to the blower wheel 24. The inner member 38 and outer member 40 of the bearing 36 are rotatably coupled to each other via ball bearings 42.

An inner screen 44 and an outer screen 46 are fixedly mounted to the housing 12 in the interior space 14. The inner screen 44 is positioned inwardly of the blower wheel 24 and the outer screen 46 is positioned outwardly of the blower wheel 24. The inner screen 44 and the outer screen 46 are both air permeable so that the blower wheel 24 may urge air through both screens 44, 46 and the screens 44, 46 prevent obstructions from interfering with the blower wheel 24. A heating element 48 is mounted in the interior space 14 of the housing 12 outwardly of the blower wheel 24. The outer screen 46 houses the heating element 48, which is operable to heat air in the interior space 14 of the housing 12.

A processor 50 is mounted in the interior space 14 of the housing 12 and is operatively coupled to the motor 30 and the heating element 48. A power supply 52 is mounted in the interior space 14 of the housing 12 and is electrically coupled to the processor 50. The power supply 52 electrically powers the heating element 48 and the motor 30 via the processor 50. The power supply 52 comprises a battery 54 but may comprise a capacitor or any suitable power storage. A charge port 56 is mounted on the housing 12 and is electrically coupled to the power supply 52. The charge port 56 may be used to charge the power supply 52 via a charging cord 62. The charge port 56 may follow a Universal Serial Bus (USB) protocol or the like. A power switch 58 is mounted on the housing 12 and is operatively coupled to the processor 50. The power switch 58 is operable to selectively activate the motor 30 and the heating element 48.

In use, the golf club handle 60 is inserted through the opening 20 in the top end 16 of the housing 12 and the power switch 58 is actuated to activate the motor 30 and the heating element 48. The air in the interior space 14 of the housing 12 is heated by the heating element 48 and directed inwardly by the blower wheel 24 toward the golf club handle 60 to dry the golf club handle 60. The housing 12 may also have additional apertures in a perimeter of the housing 12 in some embodiments which facilitates airflow inwardly from the environment, by the heating element 48, against the golf club handle 60, and out of the opening 20 of the housing 12. The drying device 10 may be attached to or placed near a golf club handle cleaning bucket 64 such as those often found at golf courses near benches 66 or the like. The drying device 10 may also be unattached to other structures during use and may be constructed of a size such that it may be transported by a user or carried in a golf bag.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A drying device for a golf club handle, the device comprising:

a housing defining an interior space therein, the housing being elongated between a top end and a bottom end, the housing defining an opening at the top end which extends into the interior space of the housing, the opening being sized and configured to accommodate the golf club handle; and a blower wheel rotatably mounted in the interior space of the housing, the blower wheel being rotatable about a central longitudinal axis of the housing, the blower wheel having blades angled such that the blower wheel is configured to urge air inwardly when rotated.

2. The device of claim 1, wherein the blades of the blower wheel are helically shaped between a pair of ends of the blower wheel.

3. The device of claim 1, further comprising a motor mounted in the interior space of the housing and operatively mounted to the blower wheel.

4. The device of claim 1, further comprising a heating element mounted in the interior space of the housing, the heating element being positioned outwardly from the blower wheel, the heating element being operable to heat air in the interior space of the housing.

5. The device of claim 4, further comprising a processor mounted in the interior space of the housing and operatively coupled to the motor and the heating element.

6. The device of claim 5, further comprising a power switch mounted on the housing and operatively coupled to the processor, the power switch being operable to selectively activate the motor and the heating element.

7. The device of claim 4, further comprising a power supply mounted in the interior space of the housing, the power supply being electrically coupled to the processor.

8. The device of claim 7, wherein the power supply comprises a battery.

9. The device of claim 7, further comprising a charge port mounted on the housing and electrically coupled to the power supply.

10. The device of claim 4, further comprising an outer screen fixedly mounted in the interior space of the housing, the outer screen being positioned outwardly of the blower wheel, the outer screen being air permeable, the outer screen containing the heating element.

11. The device of claim 1, further comprising an inner screen fixedly mounted in the interior space of the housing, the inner screen being positioned inwardly of the blower wheel, the inner screen being air permeable.

12. The device of claim 1, further comprising an outer screen fixedly mounted in the interior space of the housing, the outer screen being positioned outwardly of the blower wheel, the outer screen being air permeable.

13. The device of claim 1, further comprising a bearing mounted in the interior space of the housing distally from the bottom end of the housing, the blower wheel being rotatably mounted in the bearing.

14. A drying device for a golf club handle, the device comprising:

a housing defining an interior space therein, the housing being elongated between a top end and a bottom end, the housing defining an opening at the top end which extends into the interior space of the housing, the opening being sized and configured to accommodate the golf club handle;

a blower wheel rotatably mounted in the interior space of the housing, the blower wheel being rotatable about a central longitudinal axis of the housing, the blower wheel having blades angled such that the blower wheel is configured to urge air inwardly when rotated, the blades being helically shaped between a pair of ends of the blower wheel;

a motor mounted in the interior space of the housing and operatively mounted to the blower wheel;

a heating element mounted in the interior space of the housing, the heating element being positioned outwardly from the blower wheel, the heating element being operable to heat air in the interior space of the housing;

a processor mounted in the interior space of the housing and operatively coupled to the motor and the heating element;

an inner screen fixedly mounted in the interior space of the housing, the inner screen being positioned inwardly of the blower wheel, the inner screen being air permeable;

an outer screen fixedly mounted in the interior space of the housing, the outer screen being positioned outwardly of the blower wheel, the outer screen being air permeable, the outer screen containing the heating element;

a bearing mounted in the interior space of the housing distally from the bottom end of the housing, the blower wheel being rotatably mounted in the bearing;

a power supply mounted in the interior space of the housing, the power supply being electrically coupled to the processor, the power supply comprising a battery;

a charge port mounted on the housing and electrically coupled to the power supply; and a power switch mounted on the housing and operatively coupled to the processor, the power switch being operable to selectively activate the motor and the heating element.

* * * * *